(12) United States Patent
Rasti (10) Patent No.: US 7,100,821 B2
(45) Date of Patent: Sep. 5, 2006

(54) CHARGE CARD AND DEBIT TRANSACTIONS USING A VARIABLE CHARGE NUMBER

(76) Inventor: Mehran Randall Rasti, 13040 Sugar Bowl Ave., Baton Rouge, LA (US) 70814

( * ) Notice: Subject to any disclaimer, the term of this patent is extended or adjusted under 35 U.S.C. 154(b) by 85 days.

(21) Appl. No.: 10/845,312

(22) Filed: May 13, 2004

(65) Prior Publication Data

US 2005/0252961 A1 Nov. 17, 2005

Related U.S. Application Data

(60) Provisional application No. 60/470,669, filed on May 15, 2003.

(51) Int. Cl.
*G06K 5/00* (2006.01)
(52) U.S. Cl. .................... 235/380; 235/379; 705/39; 705/40
(58) Field of Classification Search ............... 235/379, 235/380; 705/39, 40
See application file for complete search history.

(56) References Cited

U.S. PATENT DOCUMENTS 5,267,314 A * 11/1993 Stambler ............... 713/176
5,956,699 A * 9/1999 Wong et al. ............ 705/39
6,000,832 A * 12/1999 Franklin et al. ........ 700/232
6,339,766 B1 * 1/2002 Gephart .................. 705/44
6,636,833 B1 * 10/2003 Flitcroft et al. .......... 705/1
6,805,288 B1 * 10/2004 Routhenstein et al. ... 235/380

* cited by examiner

*Primary Examiner*—Daniel Stcyr
*Assistant Examiner*—Daniel A. Hess (57) ABSTRACT

A system and method to improve on the security of credit cards when money needs to be charged or transferred by assigning a different charge number to every transaction. A charge number is a combination of the card number and a random number that is generated through a user initiated preauthorization phase. A temporary preauthorization number is issued for a maximum amount to be charged to a specific merchant. Preauthorization output is passed on to the merchant for verification and deposit purposes. A specially designed cellular phone or PDA can be used in lieu of a charge card, in which case the generated preauthorization number can either be stored in a removable memory, or be directly sent to the merchant's charge machine. The card/charge-device does not contain all of the information required for a successful transaction, therefore security is maintained despite its loss or theft of numbers.

15 Claims, 9 Drawing Sheets

VariPin Assignment LAN

Figure 1: VariPin Assignment LAN

Figure 2: Phone System LAN

VariCharge™
Charge Slip and Merchant Deposit Request

Merchant No: ☐☐☐☐☐☐  Charge Amount: ☐☐☐☐☐☐☐

Card Number: ☐☐☐☐☐☐☐  VariPin: ☐☐☐☐☐☐

Date: ☐☐☐☐☐☐  Confirmation No: ☐☐☐☐☐☐☐

||: 555201024 :|: 80731 :||

Figure 3: "VariCharge" Charge Slip and Merchant Deposit Form

| Field Name | Data Type | Field Len | Allow Nulls? | Must Fill? | Edit Mask |
|---|---|---|---|---|---|
| Password /PIN | Character | 1 to 6 | No | No | Digits |
| Card / Account Number | Character | 1 to 7 | No | No | Digits |
| Expiry Date | Character | 6 | No | Yes | YYMMDD |
| Expiry Time | Character | 5 | No | Yes | HH:MM |
| Account Status Flag | Character | 1 | No | Yes | X |
| Account Holder Name | Character | 3 to 40 | No | No | LastName, First, MI. |

Figure 4: Account Password ("Pass") Table Layout

| Field Name | Data Type | Field Len | Allow Nulls? | Must Fill? | Edit Mask |
|---|---|---|---|---|---|
| Request Date | Character | 6 | No | Yes | YYMMDD |
| Request Time | Character | 8 | No | Yes | HH:MM:SS |
| Card Number | Character | 1 to 7 | No | No | Digits |
| VariPin | Character | 3 to 7 | No | No | Digits |
| Charge Amount | Character | 3 to 7 | No | No | $'s and Cents (No Separator Character) |
| Merchant Number | Character | 3 to 7 | No | No | Digits |
| Result Flag | Character | 1 | Yes | No | Digit |

Figure 5: Payment Assignment ("Assign") Table Layout

| Field Name | Data Type | Field Len | Allow Nulls? | Must Fill? | Edit Mask |
|---|---|---|---|---|---|
| Transaction Date | Character | 6 | No | Yes | YYMMDD |
| Transaction Time | Character | 6 | No | Yes | HHMMSS |
| Account Holder Name | Character | 3 to 40 | No | No | LastName, First, MI. |
| Card Number | Character | 1 to 7 | No | No | Digits |
| Charge Account Number | Character | 1 to 16 | No | No | Digits |
| Beginning Balance | Character | 3 to 9 | No | No | $'s and Cents (No Separator Character) |
| Charge Amount | Character | 3 to 8 | No | No | $'s and Cents (No Separator Character) |
| Service Charge | Character | 1 to 7 | Yes | No | $'s and Cents (No Separator Character) |
| Ending Balance | Character | 3 to 9 | No | No | $'s and Cents (No Separator Character) |
| VariCharge Number | Character | 3 to 7 | No | No | Digits |
| Merchant Number | Character | 3 to 7 | No | No | Digits |
| Result Flag | Character | 1 | No | Yes | Digit |

Figure 6: Payment Account ("Acct") Table Layout

| Field Name | Data Type | Field Len | Allow Nulls? | Must Fill? | Edit Mask |
|---|---|---|---|---|---|
| Confirmation Date | Character | 6 | No | Yes | YYMMDD |
| Confirmation Time | Character | 8 | No | Yes | HH:MM:SS |
| Card Number | Character | 1 to 7 | No | No | Digits |
| VariPin | Character | 3 to 7 | No | No | Digits |
| Charge Amount | Character | 3 to 7 | No | No | $'s and Cents (No Separator Character) |
| Merchant Number | Character | 3 to 7 | No | No | Digits |
| Result Flag | Character | 1 | No | Yes | X |

Figure 7: Merchant Payment ("Confirm") Confirmation Table Layout

| Field Name | Data Type | Field Len | Allow Nulls? | Must Fill? | Edit Mask |
|---|---|---|---|---|---|
| Confirmation Date | Character | 6 | No | Yes | YYMMDD |
| Confirmation Time | Character | 8 | No | Yes | HH:MM:SS |
| Card Number | Character | 3 to 7 | No | No | Digits |
| VariPin | Character | 3 to 7 | No | No | Digits |
| Charge Amount | Character | 3 to 7 | No | No | $'s and Cents (No Separator Character) |
| Merchant Number | Character | 3 to 7 | No | No | Digits |
| Confirmation Number | Character | 3 to 7 | No | No | Digits |

Figure 8: Payment Transfers ("Transfers") Table Layout

| Field Name | Data Type | Field Len | Allow Nulls? | Must Fill? | Edit Mask |
|---|---|---|---|---|---|
| Confirmation Date | Character | 6 | No | Yes | YYMMDD |
| Confirmation Time | Character | 8 | No | Yes | HH:MM:SS |
| VariPin | Character | 3 to 7 | No | No | Digits |
| Merchant Number | Character | 3 to 7 | No | No | Digits |
| Approval Text | Character | 12 | No | Yes | Approved or Not Approved |

Figure 9: Payment Rejects ("Rejects") Table Layout

CHARGE CARD AND DEBIT TRANSACTIONS USING A VARIABLE CHARGE NUMBER

CROSS REFERENCE TO RELATED APPLICATIONS

This invention is a continuation of, and claims priority to USPTO Provisional Patent Application No. 60/470,669 filed on May 15, 2003.

REFERENCES CITED

U.S. Pat. No. 5,267,314; subject—Secure transaction system and method utilized therein, Stambler, Leon U.S. Pat. No. 6,956,699; subject—System for secured credit card transactions on the internet, Wong, et al, U.S. Pat. No. 6,636,833; subject—Credit card system and method, Flitcroft, et al.

U.S. Pat. No. 6,339,766; subject—Electronic payment system employing limited-use account number, Gephart, Brian R.

FEDERALLY SPONSORED RESEARCH OR DEVELOPMENT

Not applicable

REFERENCES TO SEQUENCE LISTING, TABLE, OR COMPUTER PROGRAM TABLES

Figure 4:
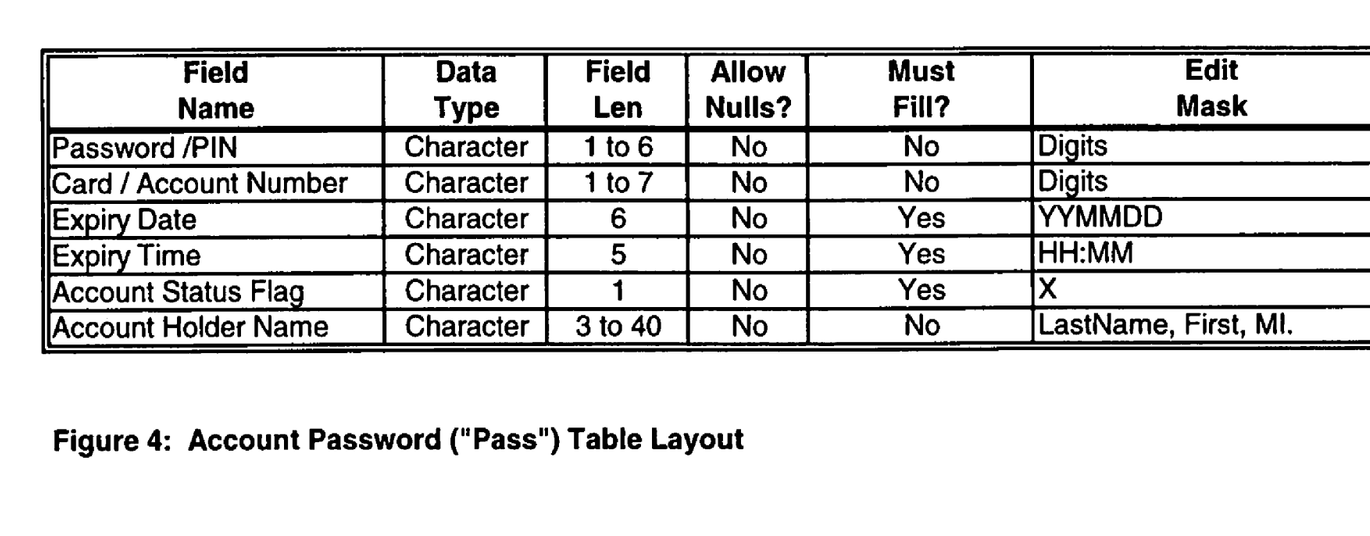
FIG. 4 is the field specification table diagram for the account password table, named "Pass"

FIG. 4 is the specification table diagram for account password table, named "Pass".

Figure 5:
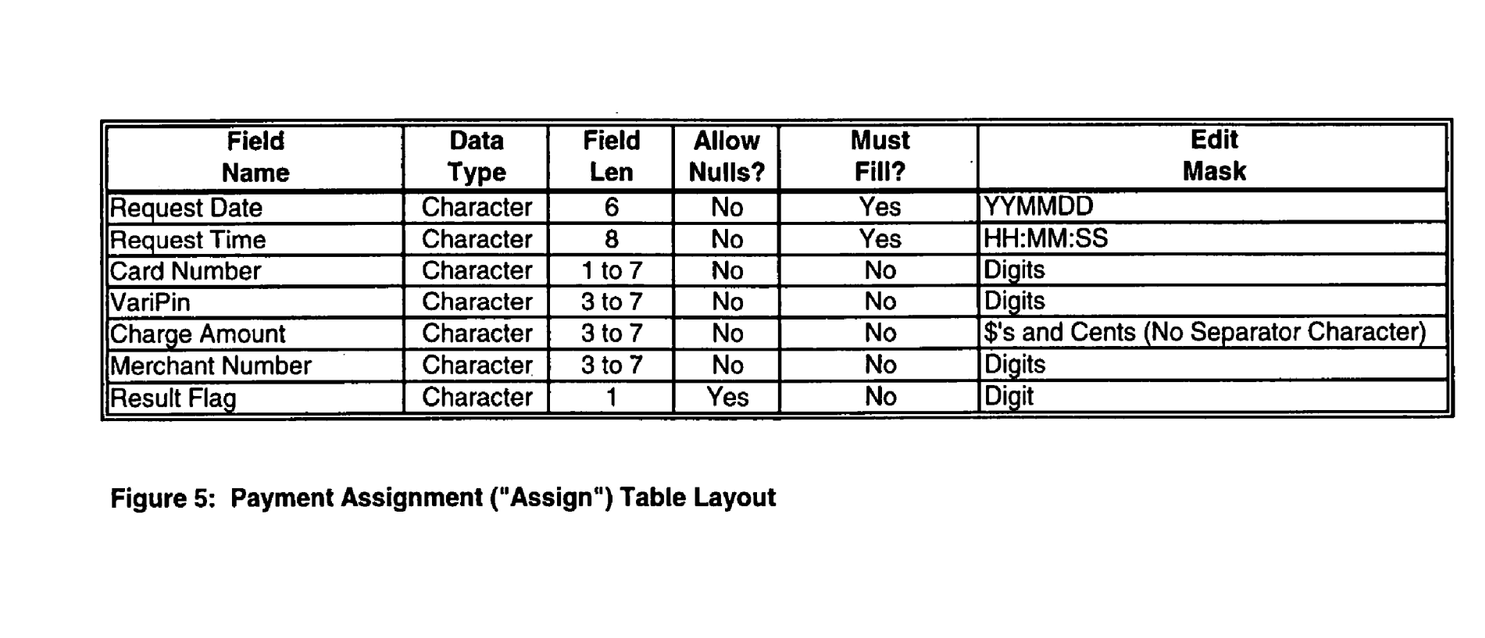
FIG. 5 is the field specification table diagram for the payment assignment table, named "Assign"

FIG. 5 is the specification table diagram for payment assignment table, named "Assign".

Figure 6:
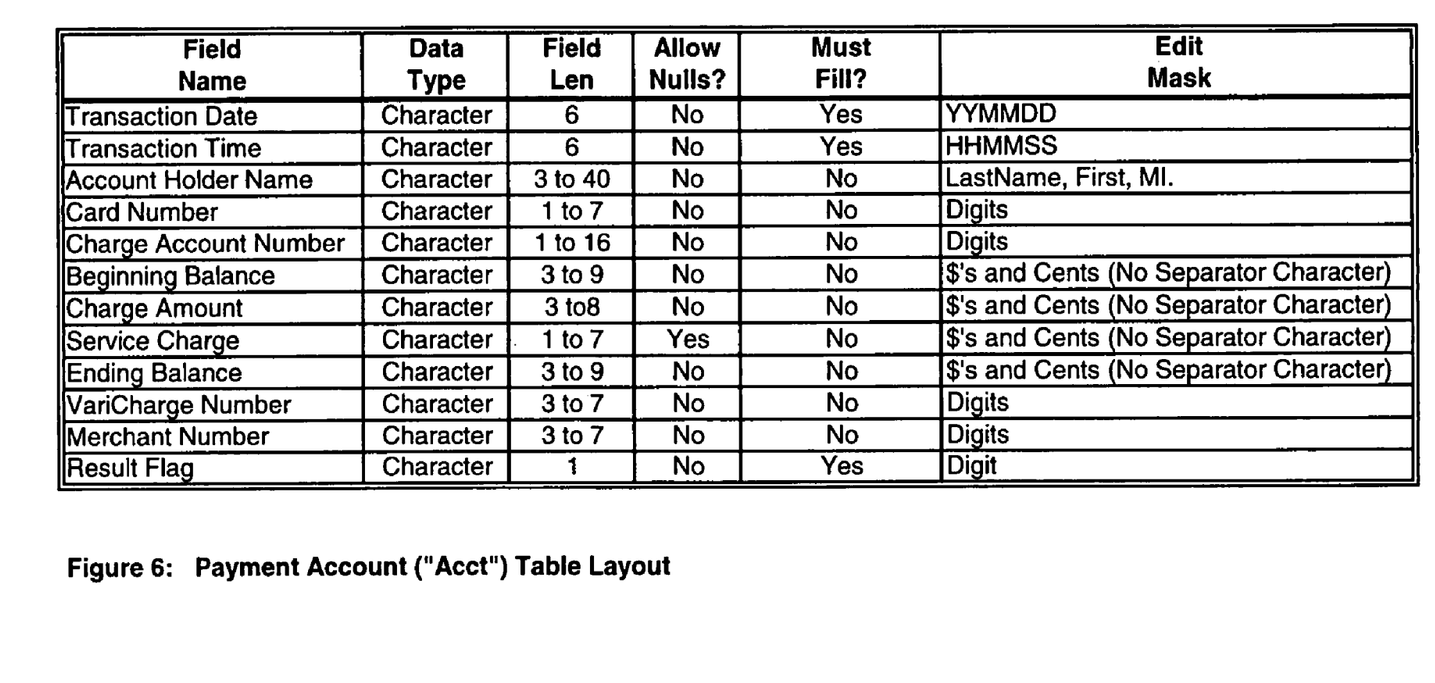
FIG. 6 is the field specification table diagram for the account and payment table, named "Acct"

FIG. 6 is the specification table diagram for account and payment table, named "Acct".

Figure 7:
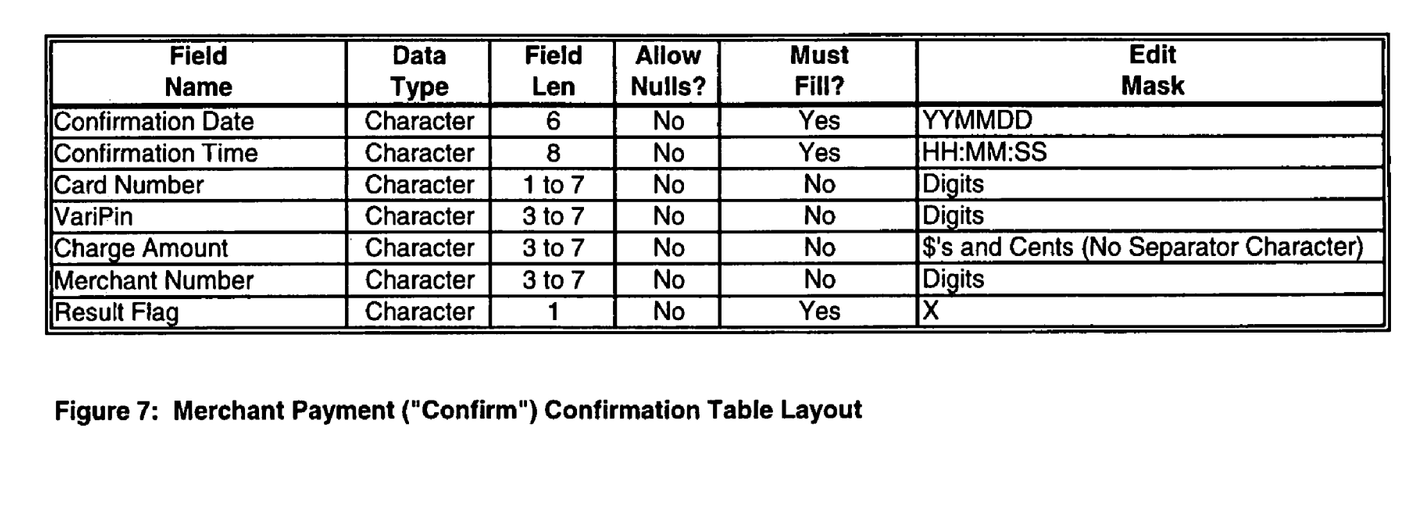
FIG. 7 is the field specification table diagram for the merchant payment confirmation table, named "Confirm"

FIG. 7 is the specification table diagram for merchant payment confirmation table, named "Confirm".

Figure 8:
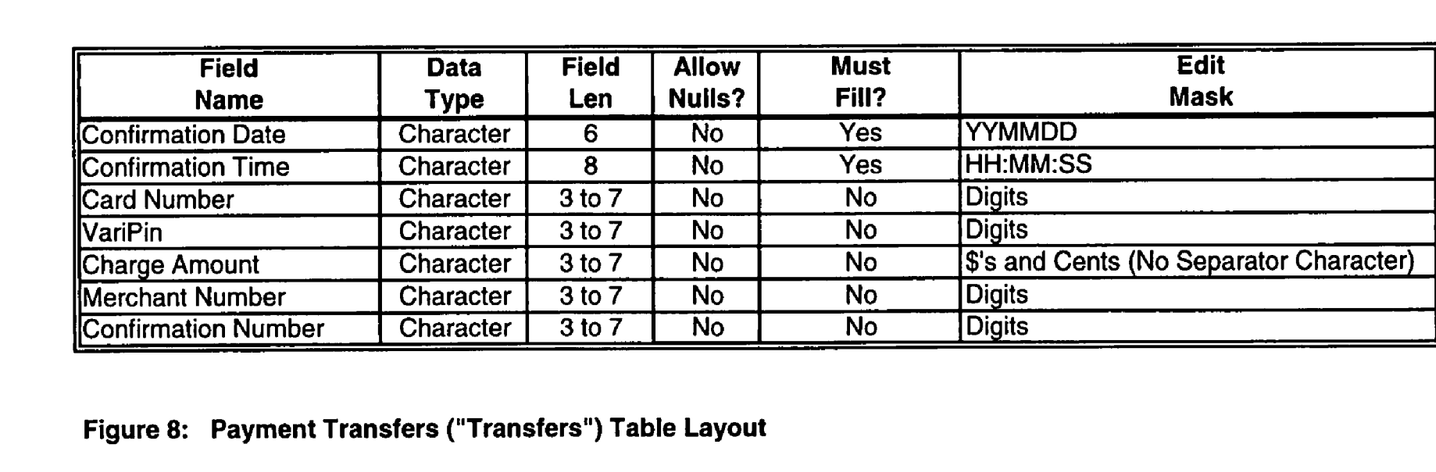
FIG. 8 is the field specification table diagram for the payment transfer to merchant, named "Transfers"

FIG. 8 is the specification table diagram for payment transfer to merchant. This table is named "Transfers".

Figure 9:
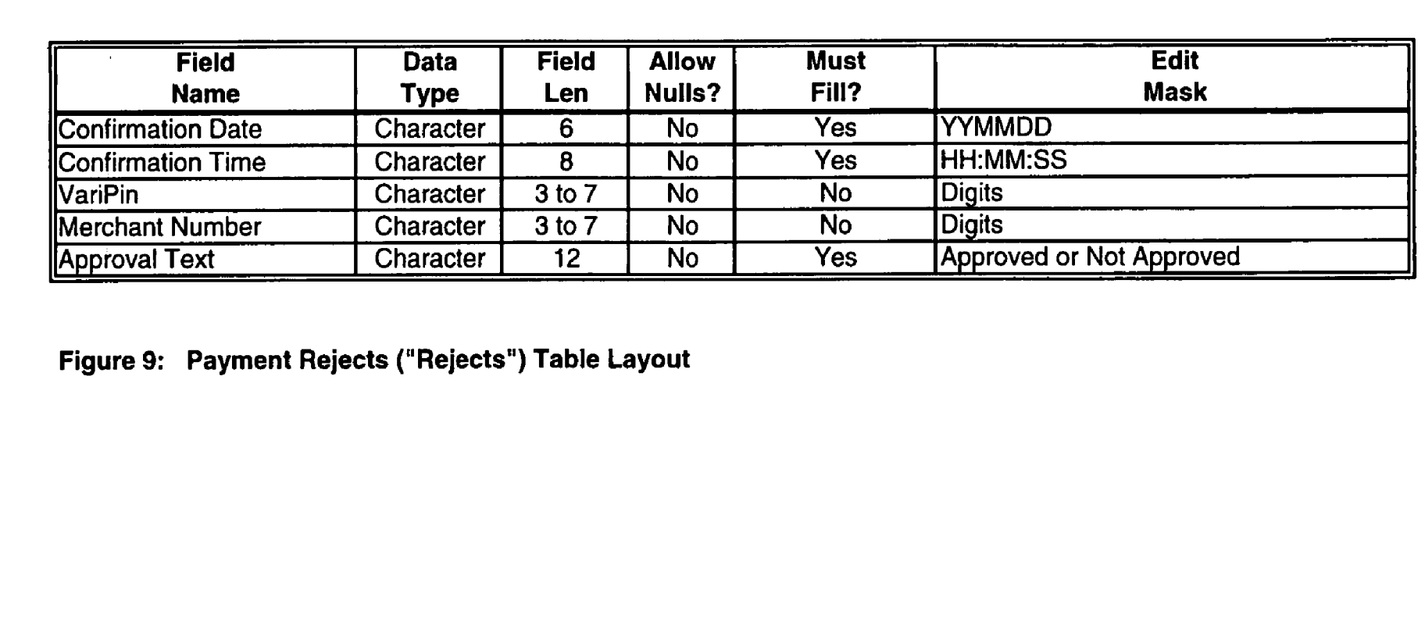
FIG. 9 is the field specification table diagram which registers all rejected transactions, named "Rejects"

FIG. 9 is the specification table diagram named "Rejects", which registers all rejected "transactions".

COMPUTER PROGRAMS

Attached on two Compact Disks to this specification document are five program listings comprising the core of the "VariCharge Process", and handle the needed charge, debit, and authentication processes. These programs also output files necessary to trace charges and account transactions to be used in back tracking and reconciliation of what has occurred, when needed. Each program has been given a general name consisting of the first few letters of its name plus a three-digit number to designate the version of the program.

Following is a general description of input, process, and output of submitted programs:

1. ASN360: The generic name of this program is "Assign". The specific version that is attached to this application is called ASN360. It assigns the cardowner's request for a charge amount for a specific merchant, and a date. The "assignment" stays valid only within the calendar day on which it was issued, and cannot be used afterwards. This version of the program works with a regular voice telephone set. The program runs at a "VariCharge Processing Center" on a computer connected to a telephone line. The program initiates itself upon sensing an incoming ring. The program answers in human voice, requests and collects the following numeric input from the originator of the call:

a) Charge account owner's charge card number
   b) Charge account owner's Personal Identification Number (PIN)
   c) The maximum amount of the charge being assigned for withdrawal
   d) The recipient merchant number. This entity is designated to receive all, or part of the assigned amount.

The charge account owner's card number and the entered PIN are matched against the PIN on file (see "Pass Table", FIG. 4). With the help of another two programs (RANDGEN, and SHUFFLE), the program assigns a random authorization number named "VariPin" (variable PIN). This number, along with the date, the requestor's card number, purchase amount, and the merchant number are announced to the caller. At this point, the caller writes down the supplied information on a specially provided form, named "Charge Slip and Merchant Deposit Request". See FIG. 3.

The "Assignment" date, time, charger's card number, amount of charge, and the recipient merchant number are also recorded in the "assign table". The "Result Flag" on that table is left as null/blank. The Assign table (FIG. 5) is fed automatically to the next step (Debit Program) for subsequent processing, as outlined below.

2. DEBIT060: The generic name for this program is "Debit", and "060" is a 3 digit number which specifies its version. This program reads, as its input, the "Account Table" (FIG. 6), along with the "Assign Table" (FIG. 5) that was created in the previous step by the "Assign" program. The program then matches the record in consideration against the proper account number, and retrieves the account holder's then current balance. In its next step, the program ads up the "assigned" chargeable amount, a service fee, and a required minimum balance to be held in the account. It then takes out this sum as the total debit out of the account balance, and comes up with a "new balance". Should this be a positive number, then the transaction is deemed a success, and the "assigned charge" is "approved". Meanwhile, resultant fields are all recorded as a new record in the "Account Table" (FIG. 6). The program copies all fields from the "Assign Table" (FIG. 5) into a new record in the "Confirm Table" (FIG. 7) with the added "Result Flag" field containing a flag to indicate whether this transaction was a successful charge debit, or not.

3. CONF352: The generic name for this program is "Confirm", and "352" is a 3 digit number which specifies its version. Similar to the "Assign" program, this version of the "Confirm" program is activated when a merchant calls a VariCharge Processing Center and connects to the computer running this program. The program asks the merchant in human voice to "touch-tone" the following numbers out of the form named "Charge Slip and Merchant Deposit Request"; see FIG. 3:

a) The assigned VariPin (authorization number) to the transaction.
   b) The "Merchant Number" who is going to collect the charge amount.

The entered VariPin and the "Merchant Number" are matched against the same fields in the "Confirm Table" (FIG. 7), and the "Result Flag" field in the same record. The calling merchant will then hear a voice message indicating the assignment date, the card number, VariPin, and the maximum amount of charge that had been authorized, should the "Result Flag" field of the same record indicate the validity of the charge being processed. A "Transaction Number" is also announced to document the approval of the "assigned sums", for merchant's deposit reference. Likewise, the merchant would be informed if the charge had not have been approved, as indicated by the "Result Flag" field of the matched record of "Confirm Table" (see FIG. 7).

For audit and reference purposes, this program also generates two other output tables, named "Transfers", and "Rejects". The "Transfers Table" records the trail of approved charge payment requests, while the "Rejects Table" records all rejected charge requests. See "Transfers Table" layout in FIG. 8, and "Rejects Table" layout in FIG. 9.

4. RANDGEN: This program runs in the background, and continuously generates random numbers, in a series of tables. The tables are named A01 through Z99. Each of the tables contains up 32,000 rows of some random numbers written in one column. Before use, the rows (records) of these tables are shuffled, using another program, named SHUFFLE, as explained below.

5. SHUFFLE: This program reads any of the files named A01 through Z99, and shuffles their rows of random numbers. The program takes a stack consisting of an arbitrary number of rows out of the bottom of the first file, and inserts it on the top of a second file at random. This way, each of the tables' rows are shuffled into a newer file, on continuous basis. If the older file was named A01, the newer file is named A02, and so forth. This process is repeated for all files named A01 through Z99. The "Assign Program" reads any one of the shuffled files (A01 through Z99), and picks one of the records from any of the files, at random. This number is named "VariPin" and serves as a preauthorization number. The added shuffling step makes it next to impossible for a hacker to be able to outguess the next VariPin, based on the commonly used "randomizing algorithms" in the programming world.

BACKGROUND OF INVENTION

1. Field of Invention

The invention provides the means for secure charge transactions. It eliminates the requirement of having to expose one's charge account number to the public. The devised pre-approval mechanism in this invention, coupled with its specially designed merchant approval methodology makes much safer charge transactions to become a reality.

2. Status of Prior Art

When credit cards were first introduced, the assumption was a face to face transaction. Both the buyer and the seller were present physically and the seller or the provider of services could verify the identity of his/her customer and verify the authenticity of the customer's signature by asking for an identification card. Later, the credit card was put to use for mail order transactions, and through lack of a password or a PIN (Personal Identification Number), the collection and verification of the card's expiry date became common practice.

The advent of the internet and selling of goods through public networks has introduced new and challenging problems, and with it lots of fraud. Stealing and copying down of credit card information goes on by some crooked employees. Offering stolen credit card numbers for sale on the internet is not rare. Whether through the internet stream, or out of a gas station pump wires, the credit card number and its expiry date, can be stolen. The 3–4 extra digits on the back of some cards is of no use in gas stations, when the card is lost, or when the card itself, is given to a vendor employee, such as a waiter, a customer service representative, or a sales clerk. The advent of SSL (Secure Socket Layer offered by Verisign and others), improve upon the theft of numbers while in transit within the internet, but again, after it reaches the vendor, the risks are the same. SSL, and similar measures taken to date, do not eliminate the potential of fraud and the theft of numbers and expiry dates, whether they be out of the sales counter or out of some web site's internet data base. This has occurred many times. In number of occasions, hackers have been able to break into several e-commerce sites and steal clients' card numbers, off computer files.

The introduction of cards with memory or recordable magnetic strips, as implemented to date, do not eliminate the credit card stolen number problem, either. Card numbers can be illegally obtained when a card is lost, stolen, or when the computer, which processes the cards, is compromised. The American Express Blue card can be mentioned as an example of this sort of a card. It is equipped with a readable RAM chip. Visa is also testing several magnetically recorded cards, but again, the card would not be totally secure when it is lost, or when their fixed numbers are exposed to third parties and the merchant employees.

A method that some banks have come up with in the recent months is to issue a temporary credit card number over the internet. This number can be used in lieu of the real card number for online purchases. Due to lack of a closed and verifiable loop between the customer's request and the merchant's approval stream, and the possibilities of "web site spoofing", this is not a good solution against the possibility of fraud, either.

SUMMARY OF INVENTION

Figure 3:
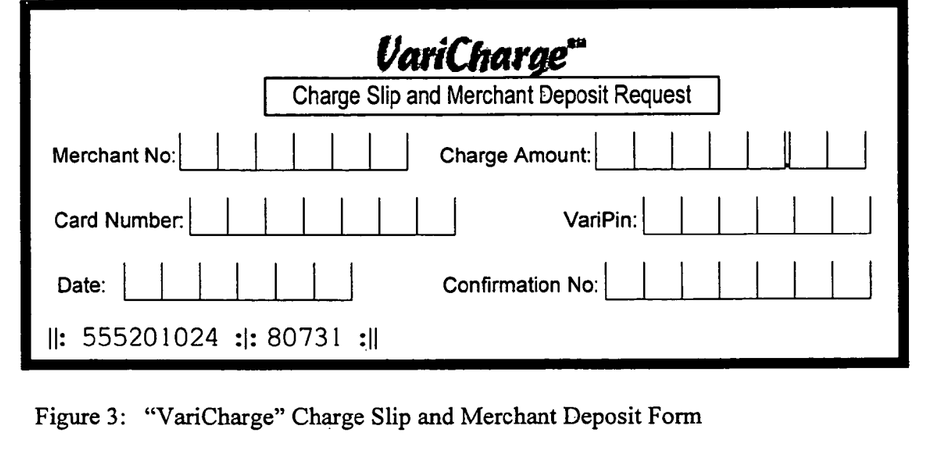
FIG. 3 is a pictorial representation of the charge/deposit request, called "Charge Slip and Merchant Deposit Request" form.

The invention serves to minimize credit card fraud through the combined use of a specially designed card and the VariCharge Process. This process consists of the following components:

1) A specially designed charge card that:
   a) does not contain a complete string of numbers or characters, necessary for charge or money transfer, anywhere on or within the card in any shape or form;
   b) uses a "charge number" that is composed of two parts: a permanent card number, and a temporary random number that must be supplied from a special charge-processing-center through a user-initiated preauthorization process;
   c) can be a specially designed cell phone or a potable device capable of dialing-up the designated charge-processing-center to receive and pass on the specified charge related data.
2) A removable (USB) memory device can be employed to transfer the generated preauthorization number from the cell phone to the merchant's charge machine/cash register, or a vending machine. A paper form as illustrated in FIG. 3 is employed for merchants that do not have the electronic capabilities required for a direct telephone interface nor a portable memory device capability to transfer charge data.

Figure 1:
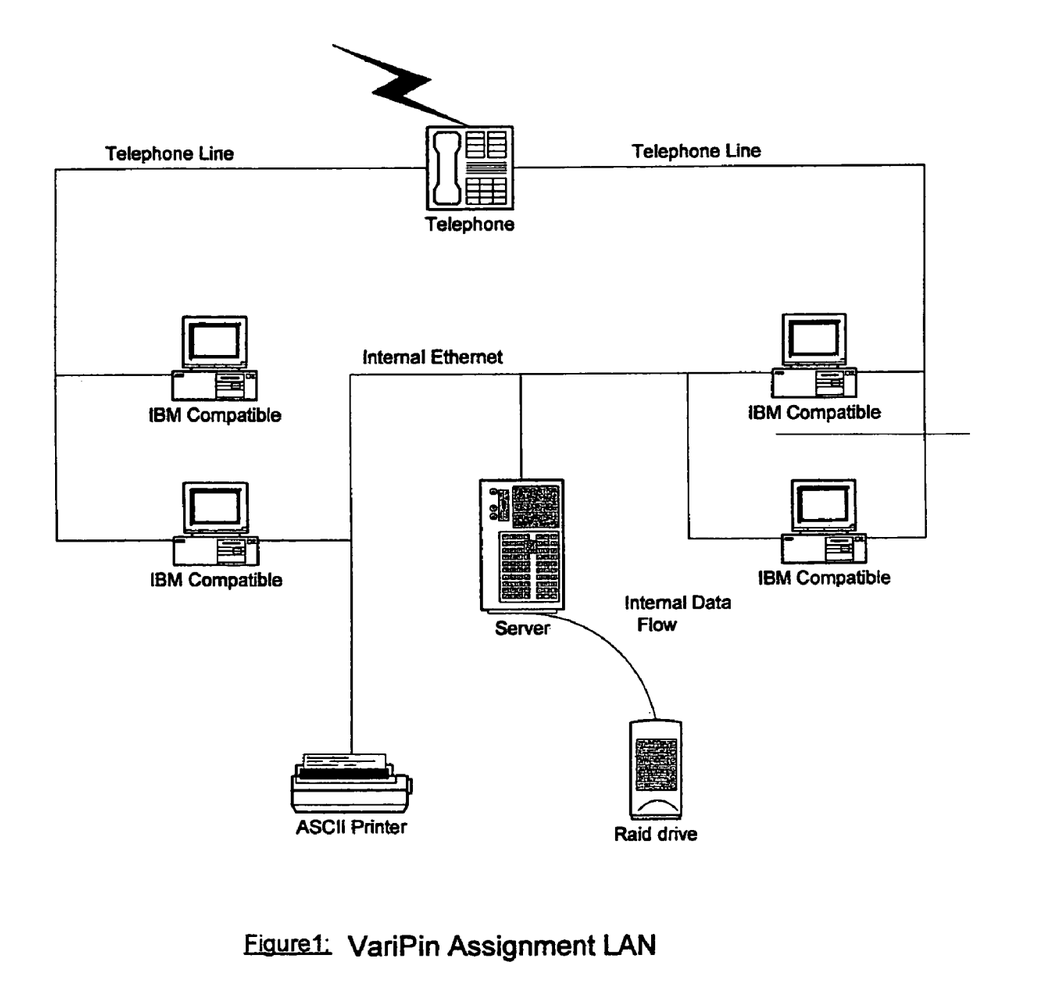
FIG. 1 shows the Variable PIN Assignment LAN (Local Area Network).
Figure 2:
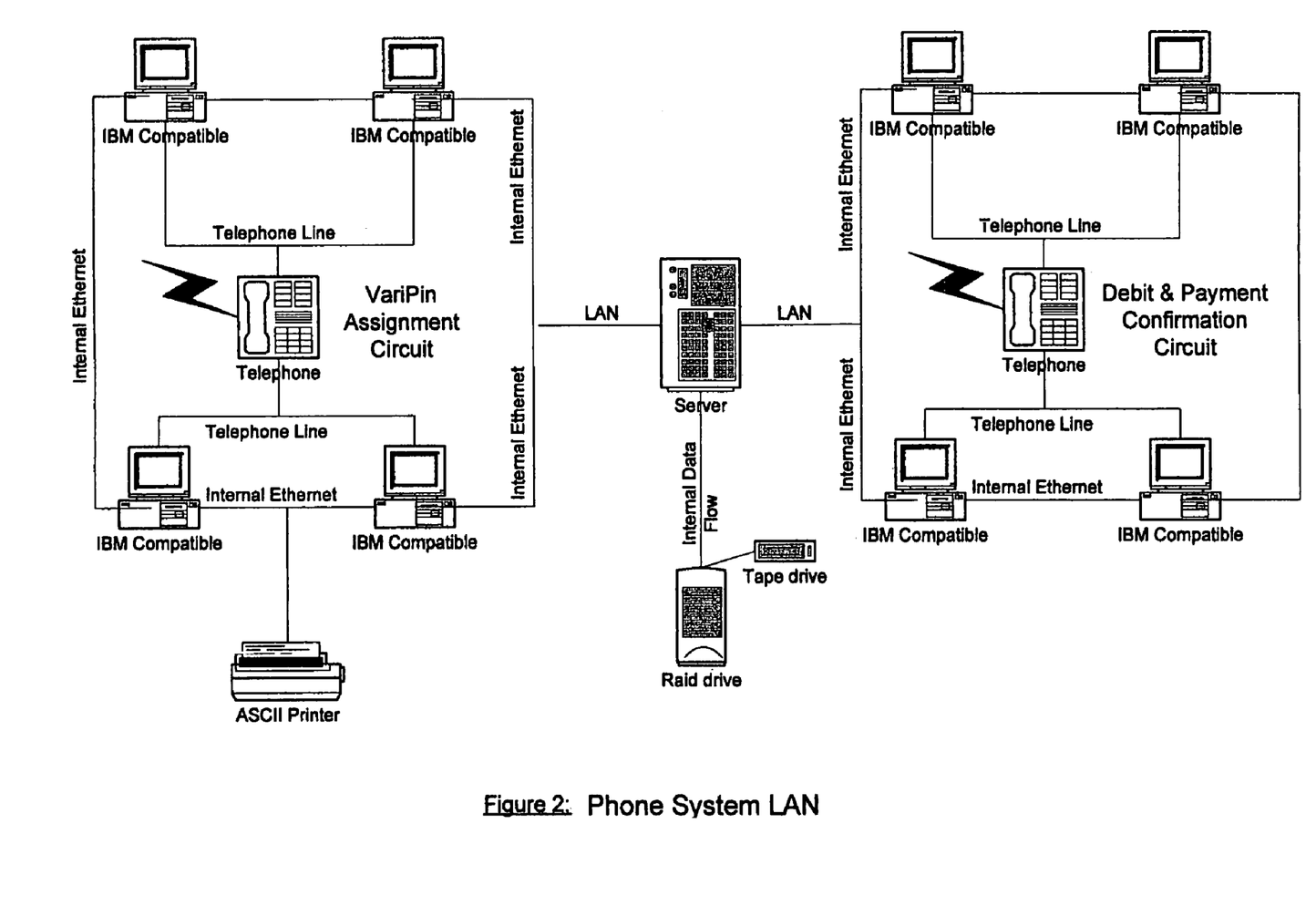
FIG. 2 shows the overall Phone System LAN.

3) A charge-processing-center must be equipped with specially configured computer system and software to handle the required functionality, as outlined in FIGS. 1 and 2.

Given the above components, a VariCharge Process uses the following steps/phases:

1. The first step in the charge process is the preauthorization step. This step is also referred to as the "Assignment Phase" in which a maximum chargeable amount is allocated to a recipient to be consummated within a limited duration. Based on the supplied information, VariCharge Process generates a unique preauthorization number, named "VariPin" (Variable PIN), by which a variable charge number that is a combination of the card number and a VariPin is formed.

At the end of the assignment phase, the card number, the issued VariPin, the approved amount, and the merchant number to whom the charge amount is assigned, is relayed back to the person or the machine process that initiated this phase.

2. Next, the assigned charge amount is compared against the charge account available balance, and based on the existence of sufficient funds, the transaction is flagged as "approved" or "not approved". When approved, the charge, plus any service fees, is debited from the account balance, and a new available balance number is generated.

3. The data generated in the above two steps, are recorded and/or printed in every step of the charge process, to serve as traceable proof of activity. A dated Charge Slip and Merchant Deposit Request and/or its electronic equivalent is generated at the end of this step.

4. In the last step of this process, the merchant should "confirm" the charge amount as represented on Charge Slip and Merchant Deposit Request, through a VariCharge Processing Center. If the charge is "approved", a confirmation number is generated and the merchant will record it on the Charge Slip and Merchant Deposit Request and/or its electronic equivalent.

5. The completed Charge Slip and Merchant Deposit Request and/or its electronic equivalent must be submitted to a VariCharge Processing Center for deposit to the merchant's account.

DETAILED DESCRIPTION

This invention entails a combination of a specially designed card, along with required processes and methodology to provide a secure charging mechanism for use with credit cards, and when transferring money and charging over the internet, or over the telephone.

A VariCharge card contains a number that is 3 to 7 digits long, while traditional charge cards bear a numerical string of 13 to 16 digits in length. In contrast to traditional charge cards, this card may print only the card number on its face, and does not print and expose the entire charge account number, nor does it contain all information needed for a successful charge/money transfer operation. Contrary to other credit cards, the VariCharge-card-number is not the same as its associated charge-account-number, and the charge number (akin to credit card number) varies with every use of the card, since it is the result of a preauthorization process. As the preauthorization varies, so does the charge number. This architecture provides an inherent built-in security into the card, and therefore, the owner of such a card and/or its issuer are not at risk when the card is lost or stolen, or if the card number and its expiry date are copied down for unauthorized use.

Security features that are built into VariCharge design include:

a) The requirement of having to supply a secret numerical password (PIN), through a preauthorization process, before the card can be used.

b) As a part of the preauthorization process, the card-owner must assign a charge amount that is payable to a specific merchant within a specified time interval, after which the preauthorization number would expire.

c) The charge account against which the charge is drawn, must hold enough balance to cover the debit, plus other required deductions, from the account balance.

d) Before a charge amount would be eligible for deposit, the merchant/recipient must connect to the VariCharge Processing Center in order to verify and acknowledge the assigned charge. This procedure is referred to as the "Confirmation Phase".

"VariCharge Assignment Phase" includes four sub-processes, or sub-methods. Any successful application of this phase requires the successful completion of all of the following four sub-processes:

1. Assigning a payment amount and issuance of a temporary, random number, named a preauthorization number.

2. Checking an account's available balance to be greater than a minimum account balance, after applying the assigned payment amount, plus any service charge, as a debit, and updating an accounting ledger.

3. Transferring charge details to the merchant (the receiving party).

4. Merchant/receiver authentication, as to the validity of a charge amount, and issuance of a "Confirmation Number".

Following is a detail description of the steps in "Varicharge Process":

1. The payment (charge) preauthorization/assignment phase:

The first step in the preauthorization process is accomplished through a program with the generic name of "Assign". For demonstration a functional prototype, version 3.52 of this program, by the name of "ASN352" is supplied with this document.

A person intending to place a charge against his/her account calls a local or a toll free telephone number which has been supplied with the charge card. The telephone ring at the other end of the call initiates this program. Other versions of this program are tailored to work over the internet, through a cell phone, or in variety of computerized cash register/charge machines. These versions will gradually be tested and introduced as market conditions would dictate. The functionality of this process, however, remains the same. That is, to pre-authorize a requested charge amount from the owner of a charge account, and to "assign" a maximum charge amount to a specific recipient.

The program starts with asking for, and accepting, 4 pieces of data from the initiator of the process. These are:

a. The card number of the client charge account.
b. The card-owner's Personal Identification Number (PIN), serving as a secrete password. The PIN must be safeguarded, and not kept with the card, nor exposed to others.
c. The maximum amount of the charge/debit being authorized for withdrawal by the recipient of the charge (the merchant).
d. The recipient's (merchant/vendor/account) number, to receive all or part of the "assigned" amount.

The process verifies the authenticity of the intended charge by matching the entered account number and PIN with those on the password file (see FIG. 4 for data structure specifications of the "Pass Table").

If not a correct combination, the program supplies two more chances for the user to supply the correct card number and PIN combination. For security reasons, the program disconnects the call if the combination is still not right. At the same time, the program logs in the card number of the incorrect attempts, and optionally the "Caller Id" of the incoming call.

When a valid card number and PIN pair are received, the program uses one of the random shuffled numbers, named "VariPin". VariPin is a 3 to 7 digit highly unpredictable random preauthorization number, generated by a pair of other programs in the process. The program, then, makes an output data stream that contains:

a) The date and time of the charge assignment request.
b) The used card number.
c) The maximum chargeable amount for this preauthorization.
d) The merchant/vendor/recipient account number to whom the charge is assigned.
e) The fresh VariPin that was just generated.

This output is recorded in the "Assign Table" (FIG. 5) for subsequent processing. In this version of the program, the output is also talked back for the charging client to write down in the "Charge Slip and Merchant Deposit Request" form of FIG. 3. In other embodiment of this invention, and depending on the type of the device used for preauthorization, the data stream is electronically transmitted to a computerized charge machine, stored in a removable memory, sent in through a telephone set, is emailed, or is faxed to the charge recipient (the merchant).

2. Generation of preauthorization numbers (VariPin):

The process consists of a combination of two programs named "RANDGEN" and "SHUFFLE" that work together. "RANDGEN" generates random numbers, and "SHUFFLE" is a record shuffling program. The important concept is the effect that is obtained from combining the two in VariCharge Process to generate highly unpredictable random numbers.

Generating random numbers is a very common task in the programming profession. Almost any programming language offers a random generating function. At any time, and for security reasons, any one, or a combination of such algorithms may be used. For this reason no proprietary code is claimed and filed with this application.

After generation of a column of random numbers, a shuffling program accepts any file that contains one random number in each of its records, and continuously shuffles them. Shuffling the random numbers within the same column consists of reading an arbitrary number of random numbers from the bottom of the first file, and subsequently copying it to the top of a second file; then reading the top of the first file (without re-reading the records that were already copied) and copying those records to the bottom of the second file in the making—and continuing this process in repetition. The exact method used in the shuffling process is altered from time to time to reduce and eliminate the ability of predicting VariPin preauthorization numbers by hackers.

Charge Slip and Merchant Deposit Request:

This paper form is exhibited in FIG. 3, and is designed for transcribing-in the preauthorization numbers and their delivery to the receiver of the funds. With the program named "ASN352", the caller will write down the date, his/her card number, the assigned VariPin, the maximum chargeable amount, and the merchant number on this form and hands it in to the merchant (or the receiver of the charged amount). Paperless and electronic implementations of this paper form can also be used.

The merchant or the receiver of the charge will have to make another call to the processing center in order to "confirm" the validity of this specific charge, and to designate it for collection/deposit.

This form contains a pre-printed bank routing and merchant account number in its bottom to facilitate its routing and its eventual deposit into the merchant's bank account.

In a paperless embodiment of the invention the person fixing to charge or transfer money will dial into a VariCharge Processing Center using a cell phone or a mobile device as shown in FIG. 1. A computer network will interact with the dial-up session and will receive the caller's internal-device-identifying-code to be used as the charge-card-number. The person charging money will be instructed to enter his/her PIN, a maximum amount to charge/transfer, and the merchant or vendor number where the money is going to be transferred to. If the entered PIN and the device code matches the ones on record, and if the user's balance is sufficient for the amount of charge, then the computer network on the processing side will issue a preauthorization number and the number will be stored on a removable memory chip that is plugged into the mobile phone/device. This memory chip containing all the charge data can later on be removed and transferred to the merchant's cash register/charge machine for merchant's authentication of the charge amount, the issued preauthorization number, and the merchant/vending machine number.

Alternately, once the mobile device receives the preauthorization number, it can directly transfer all of charge related information, such as the amount and the merchant/vendor number to the merchant's cash register, vending, or charge machine, provided the merchant's (receiving end) equipment is compatible with VariCharge method of charging.

3. Checking the Account Balance and Debiting of Charges:

This process is accomplished through the execution of a program named "Debit06". This process continuously monitors and looks for any new, incoming, record in the "Assign Table" of FIG. 5. Recall that the card numbers in this table have already been authenticated through an earlier sub-process.

Upon the incoming of a new record from the "Assign Table" of FIG. 5, this program matches the card number in this record with the same from the "Acct" Table" of FIG. 6. It then debits the assigned charge and the associated service fees against then current account balance, such that a minimum pre-specified balance level (if required) is to be maintained. This program, also calculates a percentage as "Service Fee", if needed, to be paid by the account holder as a per transaction service charge. When and if specified, the latter is also deducted as a debit from the account's current balance.

After all said debits are deducted from then current balance, should the resulting new balance be larger than a predefined minimum balance in the account, a new record is generated in the "Acct Table" of FIG. 6, with a "Confirmed Result Flag" indicating a successful debit transaction. In this case, the corresponding record in the "Assign Table" of FIG. 5 in computer memory is written to a new table, named "Confirm". See FIG. 7. This record now contains a flag indicating a successful process.

In another case, if after applying all such debits, the account balance should result in a negative number, or one below the predefined minimum account balance, then a new balance record, less a small service charge (if required), is written to the "Acct Table" of FIG. 6. Also, the record in the "Confirm Table" of FIG. 8 is marked with a "Rejected Result Flag".

With this design, a historical reference of the requested transactions is made available via "Acct Table" of FIG. 6, and the "Confirm Table" of FIG. 8. The combination can be used for error checking, auditing operations, and account reconciliation purposes, if and when needed. The "Confirm Table" of FIG. 8 is made available to the merchant confirmation phase.

4. Merchant/Recipient Charge Confirmation Phase:

In this step, the merchant must "confirm" the charges, and supplement the data with a "Confirmation Number" obtained through this process.

In its simplest form, the merchant will dial into a VariCharge Processing Center, and will enter his/her "merchant number" along with a VariPin that is specified on the "Charge Slip and Merchant Deposit Request" of FIG. 3.

The response from this process can come in two forms: "Approved", or "Not Approved". When approved, a "Confirmation Number" is issued along with the approved charge amount, card number, and the date of the charge, or transfer.

All "approved" charges are collected in a table, named "Transfers"; see FIG. 8. Likewise, all rejected transactions are written in a table, named "Rejects"; see FIG. 9. These files are used for tracing and reconciliation purposes, when needed.

In cases of "Approved" charges, the merchant shall write the "Confirmation Number" in the space provided on the Charge Slip and Merchant Deposit Request, and will issue a receipt to the customer. For funds to be deposited, a merchant will also have to send in the completed form of FIG. 3 to the VariCharge Processing Center. This deposit request will be processed in accordance with certain terms and conditions set forth in merchant account agreement.

The above confirmation has to occur within the date and time for which the "assignment" is still valid; meaning, within the life span of the issued VariPin.

Conversely, should the merchant hear the words, "not approved", the merchant must notify the charging client that the charges did not go through, and should not ship or deliver the goods or services pertaining to the charge. In cases where the entered merchant number and the VariPin do not pair-up with the same entries on the "Confirm Table", the confirmation phase is deemed as failed.

Charging Purchases from the Internet:

When the charging customer is ordering through the internet, the charge "assignment" phase is still done by using a voice phone call, as described in section 1, above. The charging client, then signs on to the VariCharge internet site and enters the preauthorization number (VariPin) that had been obtained at the end result of the "assignment" phase. The client then enters, and submits the collection of information to the VariCharge Processing Center, via the internet. In this mode of operation, the client needs to also specify the email addresses of himself/herself, and that of the merchant's (the receiver of the charge amount).

After receiving the preauthorization data via e-mail, the merchant/recipient will transfer them on to a Charge Slip and Merchant Deposit Request form (FIG. 3). The merchant then calls the VariCharge Processing Center and "confirms" (approves) the validity of the charge amount assigned to the merchant number.

In the next step, the merchant/recipient will send back an e-mail to the charging customer and informs him/her of the results of the charge transaction, along with a purchase receipt, and shipping information.

Shopping and Charging over the Telephone:

For mail orders and charging over the phone, the charging customer would have to know the merchant number, and the maximum amount of the order, before he/she is able to make a preauthorization request call to VariCharge Processing Center.

After that, the customer will call the merchant, orders the goods, and will tell the merchant that he/she is using VariCharge. The merchant will then ask for the customer's card number, and the preauthorization number (VariPin) that had been assigned to this purchase. Card-holders should be advised not to disclose their PIN to the merchant, since it is not necessary to complete the purchase.

Since the merchant knows the exact price, it can complete a Charge Slip and Merchant Deposit Request (FIG. 3). The merchant would then, call the VariCharge Processing Center to "confirm" the validity of the charges assigned, and would obtain a "Confirmation Number" when the charge is approved.

Shopping in the Presence of a Clerk Equipped with a Computerized Cash Register/Charge Machine:

Just like an ordinary credit card purchase, the shopper will go through a check out line, using his/her VariCharge card, if the said merchant honors such a card. After scanning the card on the charge machine, the machine will command the clerk or the shopper for the entry of PIN. For privacy, a shopper can use a modified transmitting numeric pad or a telephone set to enter his/her PIN. Alternately, a shopper can use a PIN entry pad provided at the check out counter to do this. Depending on the merchant capabilities and requirements, a cash register machine, or a telephone device is used. The machine already has the merchant number in its memory, as well as the total amount to be charged. If not, the sales clerk can key in this information. This completes the four data pieces needed as input for a VariCharge Process to complete.

At this stage, the machine makes a call (or connection through a secure internet link) to a VariCharge Processing Center and transmits the data items needed for this process. At the end of the process, an approval flag value is issued that can be used as "Confirmation Number" for the merchant to cash in the deposit. However, if a "Not Approved" flag is issued, the merchant should consider the charges as rejected.

Note that in this type of transaction the "Confirm Phase" was skipped. The reason is that security is maintained by the fact that the customer has already passed the match between his/her card number and the required PIN. The latter is the clue to the ownership of the charge card.

At the last step, the charge machine shall generate a completed Charge Slip and Merchant Deposit Request form of FIG. 3 as the successful end of the charge process. On a successful charge transaction, a receipt copy of the amount charged, and the "Confirmation Number" for the charge are also given to the customer, along with the goods and/or services. If the charge did not go through with success, the customer is informed, and/or the process is tried for a second time.

As described, this invention introduces a safe and modern way of performing charge card and money transfer transactions through a specially designed charge device (card) in conjunction with a proprietary charge-processing-center, as specified in FIGS. 1, and 2. The hardware and software capabilities of such a charge center is substantially different from all currently used "gateways". The charge card or device is also different in that it is useless by itself without a preauthorization step to take place before use. This is due to the fact that the charge number is constructed of two parts: a fixed card number and a temporary preauthorization number whose origin is external to the card. The preauthorization number/string, itself is temporary, is issued based on specific charge particulars, and also requires the entry of a confidential PIN. With such requirements and design, the card/charge device is protected against unauthorized use even when it is lost or stolen.

I claim:

1. A method for completing a charge transaction on a charge account comprising the steps of:
   a) providing a user with a charge account;
   b) providing a user with a partial charge account number corresponding to the charge account which cannot by itself be used for a charge transaction;
   c) enabling a user to obtain a personal identification number (PIN) corresponding to the charge account;
   d) receiving an account request including
      i. said partial charge account number
      ii. said PIN number of user associated with said account
      iii. a maximum amount to be charged
      iv. a merchant number or vendor identification code
   e) if said account request is valid and there are sufficient funds, sending in response a temporary preauthorized string of digits which together with the partial charge account number form a complete charge number which can be used for a charge transaction only in association with said merchant number/vendor identification code or otherwise sending in response a rejection communication.

2. The method of claim 1, wherein said complete charge number is temporary.

3. The method of claim 1, wherein an account file for said user stores said partial charge number but not said complete charge number.

4. The method of claim 1, wherein said response is sent through email.

5. The method of claim 1, wherein said response is printed on paper.

6. The method of claim 1, wherein said response is stored on removable memory.

7. The method of claim 1, wherein said response is sent via telephone.

8. The method of claim 1, wherein said receiving and response steps are carried out through a processing center.

9. The method of claim 1, wherein in response to a request from said merchant or vendor including
   i. said partial charge account number
   ii. said preauthorized string of digits
   iii. a charge amount that is less than or equal to said maximum amount to be charged
   iv. said merchant number or vendor identification code
said vendor or merchant is provided with confirmation or denial of receivable funds.

10. A system which enables the completion of a charge transaction on a charge account said system having means to
   a) provide a user with a charge account;
   b) provide a user with a partial charge account number corresponding to the charge account which cannot by itself be used for a charge transaction;
   c) enable a user to obtain a personal identification number (PIN) corresponding to the charge account;
   d) receive an account request including
      i. said partial charge account number
      ii. said PIN number of user associated with said account
      iii. a maximum amount to be charged
      iv. a merchant number or vendor identification code
   e) if said account request is valid and there are sufficient funds, send in response a temporary preauthorized string of digits which together with the partial charge account number form a complete charge number which can be used for a charge transaction only in association with said merchant number/vendor identification code or otherwise send in response a rejection communication.

11. The system of claim 10, wherein said complete charge number is temporary.

12. The system of claim 10, wherein said response is sent through email.

13. The system of claim 10, wherein said response is printed on paper.

14. The system of claim 10, wherein said response is stored in removable memory.

15. The system of claim 10, wherein said account request is sent via telephone.

* * * * *